United States Patent
Roca et al.

(10) Patent No.: US 10,722,824 B2
(45) Date of Patent: Jul. 28, 2020

(54) DEVICE TO SEPARATE WATER AND SOLIDS OF SPRAY WATER IN A CONTINUOUS CASTER, AND METHOD TO MONITOR AND CONTROL CORROSION BACKGROUND

(71) Applicant: ECOLAB USA INC., St. Paul, MN (US)

(72) Inventors: Laia More Roca, Leiden (NL); Ashraf Mohammed, Munich (DE); Paloma Lopez Serrano, Delft (NL); Andrew Edwin Lerrick, Delft (NL); Peter de Graaf, Amsterdam (NL)

(73) Assignee: ECOLAB USA INC., St. Paul, MN (US)

( * ) Notice: Subject to any disclaimer, the term of this patent is extended or adjusted under 35 U.S.C. 154(b) by 124 days.

(21) Appl. No.: 15/785,844

(22) Filed: Oct. 17, 2017

(65) Prior Publication Data
US 2018/0104624 A1    Apr. 19, 2018

Related U.S. Application Data

(60) Provisional application No. 62/409,853, filed on Oct. 18, 2016.

(51) Int. Cl.
*B01D 21/24* (2006.01)
*B22D 11/124* (2006.01)
(Continued)

(52) U.S. Cl.
CPC ....... *B01D 21/245* (2013.01); *B01D 21/0024* (2013.01); *B01D 21/01* (2013.01);
(Continued)

(58) Field of Classification Search
CPC ...... B22D 11/22; B22D 1/124; B01D 21/302; B01D 21/24; B01D 21/01; C02F 1/52
See application file for complete search history.

(56) References Cited

U.S. PATENT DOCUMENTS 3,160,896 A * 12/1964 Smith, Jr.
4,047,985 A    9/1977 Greenberger
(Continued)

FOREIGN PATENT DOCUMENTS

| AT | 506673 A1 | 11/2009 |
|---|---|---|
| CN | 101187587 A | 5/2008 |

(Continued)

OTHER PUBLICATIONS

JP003220392 (A), Aug. 5, 2003, English machine translation document, Kazuhiro et al. (Year: 2003).*

(Continued)

*Primary Examiner* — Ana M Fortuna
(74) *Attorney, Agent, or Firm* — Eric D. Babych; Barnes & Thumburg LLP

(57) ABSTRACT

A system and methods are disclosed for treating cooling fluid in a continuous metal casting process having a spray chamber. In some embodiments, the system includes a first compartment with an intermittently operable outlet (e.g., valve) with an open state and a closed state, for removing particulate matter, and a second compartment that receives particle-free fluid from the first compartment. The first compartment may be tapered, conical, funnel, pyramidal shape or otherwise narrowed shape to facilitate settling of the particles. One or more sensors measure at least one property of the particle-free fluid to determine the opened or closed state of the outlet and to adjust chemical additives for the cooling fluid. In some embodiments, the system and methods reduce corrosion in spray chambers.

11 Claims, 9 Drawing Sheets

(51) Int. Cl.
  *B01D 21/30* (2006.01)
  *B01D 21/01* (2006.01)
  *B01D 21/00* (2006.01)
  *C02F 1/52* (2006.01)
  *C02F 103/02* (2006.01)

(52) U.S. Cl.
  CPC .......... *B01D 21/302* (2013.01); *B22D 11/124* (2013.01); *C02F 1/52* (2013.01); *C02F 2103/023* (2013.01); *C02F 2303/08* (2013.01)

(56) References Cited

U.S. PATENT DOCUMENTS

| | | | |
|---|---|---|---|
| 4,306,610 A | 12/1981 | Ahmed | |
| 4,699,202 A * | 10/1987 | Gilles | B22D 11/225 164/414 |
| 5,647,996 A | 7/1997 | Yablonsky et al. | |
| 5,938,935 A | 8/1999 | Schimion | |
| 6,031,861 A | 2/2000 | Koster | |
| 6,073,676 A | 6/2000 | Hairy et al. | |
| 6,205,799 B1 * | 3/2001 | Patel | F25B 39/04 165/104.33 |
| 6,270,679 B1 | 8/2001 | Kreisler | |
| 6,274,045 B1 | 8/2001 | Kreisler | |
| 8,302,662 B2 | 11/2012 | Kawa et al. | |
| 2005/0025660 A1 | 2/2005 | Hoots et al. | |
| 2005/0244315 A1 | 11/2005 | Greaves et al. | |
| 2005/0279715 A1* | 12/2005 | Strong | B01D 17/0211 210/774 |
| 2008/0160626 A1 | 7/2008 | Hoots et al. | |
| 2009/0084517 A1* | 4/2009 | Thomas | B22D 11/066 164/454 |
| 2011/0006014 A1 | 1/2011 | Scalise et al. | |
| 2014/0263083 A1 | 9/2014 | Bioton et al. | |

FOREIGN PATENT DOCUMENTS

| | | |
|---|---|---|
| CN | 101187618 A | 5/2008 |
| CN | 201138224 Y | 10/2008 |
| CN | 101367119 A | 2/2009 |
| CN | 201291227 Y | 8/2009 |
| CN | 102284687 A | 12/2011 |
| CN | 102416456 A | 4/2012 |
| CN | 102513514 A | 6/2012 |
| CN | 202377498 U | 8/2012 |
| CN | 202401519 U | 8/2012 |
| CN | 202984623 U | 6/2013 |
| CN | 202991629 U | 6/2013 |
| CN | 203048620 U | 7/2013 |
| CN | 203245346 U | 10/2013 |
| CN | 203448654 U | 2/2014 |
| CN | 103657249 A | 3/2014 |
| CN | 203541475 U | 4/2014 |
| CN | 103878336 A | 6/2014 |
| CN | 103983751 A | 8/2014 |
| CN | 204129488 U | 1/2015 |
| CN | 104525885 A | 4/2015 |
| CN | 104568410 A | 4/2015 |
| CN | 204321133 U | 5/2015 |
| CN | 104785742 A | 7/2015 |
| CN | 204504169 U | 7/2015 |
| CN | 205042194 U | 2/2016 |
| DE | 3305660 A1 | 9/1983 |
| DE | 19754272 A1 | 6/1999 |
| DE | 19754273 A1 | 6/1999 |
| DE | 10205456 A1 | 8/2003 |
| DE | 102009049897 A1 | 4/2011 |
| DE | 202015002457 U1 | 4/2015 |
| EP | 0494805 A1 | 7/1992 |
| IN | 1427/KOL/2011 | 10/2014 |
| JP | S 5956956 A | 4/1984 |
| JP | H 04200666 A | 7/1992 |
| JP | H 05305408 A | 11/1993 |
| JP | H 07227614 A | 8/1995 |
| JP | H 081309 A | 1/1996 |
| JP | H 1099943 A | 4/1998 |
| JP | H 11221649 A | 8/1999 |
| JP | 2001179414 A | 7/2001 |
| JP | 2002143998 A | 5/2002 |
| JP | 2003220392 * | 8/2003 |
| JP | 2003220392 A | 8/2003 |
| JP | 2007125570 A | 5/2007 |
| JP | 2012170984 A | 9/2012 |
| JP | 2014237122 * | 12/2014 |
| JP | 2014237122 A | 12/2014 |
| JP | 2015231597 A | 12/2015 |
| KR | 1020030022997 | 3/2003 |
| KR | 1020040012073 | 2/2004 |
| KR | 1020040047286 | 6/2004 |
| KR | 1005784810000 | 5/2006 |
| KR | 1020110022331 | 3/2011 |
| KR | 1010863150000 | 11/2011 |
| KR | 1020120020508 | 3/2012 |
| KR | 1020120032917 | 4/2012 |
| KR | 1020120044429 | 5/2012 |
| KR | 1012361230000 | 2/2013 |
| KR | 1020130053093 | 5/2013 |
| KR | 1020130134465 | 12/2013 |
| KR | 1020140129837 | 11/2014 |
| KR | 1015609780000 | 10/2015 |
| SU | 442004 A1 | 9/1974 |
| SU | 923734 A1 | 4/1982 |
| SU | 933218 A1 | 6/1982 |
| SU | 1088870 A1 | 4/1984 |
| SU | 1197771 A1 | 12/1985 |
| WO | WO 1984/002670 A1 | 7/1984 |
| WO | WO 1986/005724 A1 | 10/1986 |
| WO | WO 1996/022852 A1 | 8/1996 |
| WO | WO 1997/029617 A1 | 8/1997 |
| WO | WO 1998/011183 A1 | 3/1998 |
| WO | WO 2003/106074 A2 | 12/2003 |
| WO | WO 2004/110674 A2 | 12/2004 |
| WO | WO 2009/089843 A1 | 7/2009 |
| WO | WO 2010/037480 A1 | 4/2010 |
| WO | WO 2012/110531 A1 | 8/2012 |
| WO | WO 2018/075471 * | 4/2018 ............ B01D 21/01 |

OTHER PUBLICATIONS

JP02013237130A (abstract only)"Method for recovering coolant"; Koji et al. (Year: 2013).*

Derwent abstract account 2012-E55593, week 201316, Lim S.Y. et al (Year: 2012).*

Derwent abstract 2007-453088, week 200744, Kozutsumi et al. (Year: 2007).*

JP2014237122 (A), Dec. 18, 2014 (machine translation only), Tetsuro et al. (Year: 2014).*

PCT International Search Report and Written Opinion for PCT/US2017/056908, dated Dec. 8, 2017, 15 pages.

Alkhedhair, Abdullah, et al. "Water spray for pre-cooling of inlet air for Natural Draft Dry Cooling Towers—Experimental study," International Journal of Thermal Sciences (2015), 90, pp. 70-78.

Allhands, Marcus N. "Caster Nozzle Protection," Iron and Steel Technology (Dec. 2010), 7(12), pp. 73-77.

"Automatic filters prevent nozzle blockages on cooling water system," Filtration and Separation (Apr. 2004), 41(3), pp. 32-33.

Cucchiaro, V., et al. "*Gestion des circuits d'eau d'une coulee continue*; Management of water circuits of a continuous ingot caster," *Revue de Metallurgie/Cahiers d'Informations Techniques* (1985), 82(7), pp. 545-553. (English Abstract).

"*Gesteigerte Verfugbarkeit der Papiermaschine durch Olmonitoring and Olpflege*; Increased availability of the paper machine through oil monitoring and oil maintenance," *Wochenblatt fuer Papierfabrikation* (Jun. 2005), 133(11-12), pp. 718-720. (English Abstract).

Guo, Liang-liang, et al. "Temperature distribution and dynamic control of secondary cooling in slab continuous casting," International Journal of Minerals, Metallurgy and Materials (Dec. 2009), 16(6), pp. 626-631.

(56) References Cited

OTHER PUBLICATIONS

Ivanova, Anna. "Model Predictive Control of Secondary Cooling Modes in Continuous Casting," Metal 2013—22$^{nd}$ International Conference on Metallurgy and Materials, Conference Proceedings (2013), 6 pages.

Kondo, Osamu, et al. "New Dynamic Spray Control System for Secondary Cooling Zone of Continuous Casting Machine," Steelmaking Conference Proceedings (1993), 76, pp. 309-314.

Kuroda, S., et al. "Microstructure and Corrosion Resistance of HVOF sprayed 316L Stainless Steel and Ni Base Allow Coatings," Proceedings of the 1$^{st}$ International Thermal Spray Conference (2000), pp. 455-462.

Liu, Wen-hong, et al. "Design and Simulation Based on Fuzzy Self-adaptive PID for Secondary Cooling Control System during Continuous Casting," *Dongbei Daxue Xuebao*;Journal of Northeastern University (Natural Science) (Dec. 2007), 28(12), pp. 1693-1696. (English Abstract).

Mazur, Joseph J., et al. "Innovative Technology Uniting New Chemicals with Advanced Monitoring and Control Optimizes the Performance of Cooling Water Systems in Metal Production Processes," Light Metals 2005—Proceedings of the Technical Sessions Presented by the TMS Aluminum Committee (Feb. 2005), pp. 995-1000, and 1236.

Pardell, John. "Platers' Other Pollution Problem," Products Finishing (Aug. 1985), 49(11), pp. 74-77.

Pengidore, D.A. "Application of deep bed filtration to improve slab caster recirculated spray water," Iron and Steel Engineer (Jul. 1975), 52(7), pp. 42-45.

Petrus, Bryan, et al. "Real-Time, Model-Based Spray-Cooling Control System for Steel Continuous Casting," Metallurgical and Materials Transactions B: Process Metallurgy and Materials Processing Science (Feb. 2011), 42(1), pp. 87-103.

Prasad, A., et al. "Improved online water leakage detection and flow monitoring for caster rolls," Steel Times International (Jan. 2012), 36(1), pp. 37-38.

Roser, Scott D., et al. "Optimization of Secondary Cooling Water Filtration in a Continuous Stainless Steel Casting Process," Proceedings of the 37$^{th}$ Industrial Waster Conference (May 1982), pp. 691-707.

Scalise, Joseph F. "Continuous cast filtration concepts," Wire Journal International (Apr. 2004), 37(4), pp. 152-157.

Sengupta, J., et al. "The Use of Water Cooling during the Continuous Casting of Steel and Aluminum Alloys," Metallurgical and Materials Transactions A (Jan. 2005), 36(1), pp. 187-204.

Somasundaram, Sivanand, et al. "Intermittent Spray Cooling—Solution to Optimize Spray Cooling," Proceedings of the 2012 IEEE 14$^{th}$ Electronics Packaging Technology Conference (2012), pp. 588-593.

Zeng, Zhi, et al. "Monitoring and analysis on mold cooling water temperature difference for bloom continuous casting," *Lian Gang*; Steelmaking (Feb. 2012), 28(1) pp. 15-19. (English Abstract).

Zheng, Kai, et al. Design and Implementation of a Real-time Spray Cooling Control System for Continuous Casting of Thin Steel Slabs, AISTech 2007—Proceedings of the Iron and Steel Technology Conference (May 2007), 2, 17 pages.

\* cited by examiner

DEVICE TO SEPARATE WATER AND SOLIDS OF SPRAY WATER IN A CONTINUOUS CASTER, AND METHOD TO MONITOR AND CONTROL CORROSION

BACKGROUND

TECHNICAL FIELD

The disclosure relates generally to metal manufacturing. More specifically, the disclosure relates to a device and method that monitors and separates particles from spray water of a spray chamber in a continuous metal caster.

BACKGROUND

Continuous casting is a method of converting molten metal into semi-finished metal products such as billets, blooms, or slabs, and is useful for high volume and continuous production. The process is commonly used to form steel, but may be used to form other metals, such as aluminum and copper. Typically in continuous casting, molten metal is collected in a trough called a tundish and then passed at a precisely controlled rate into a primary cooling zone. In the primary cooling zone, the molten metal enters a solid mold (frequently made of copper, and often water-cooled). The solid mold draws heat from the molten metal causing a solid "skin" of metal to form around a still liquid core. The solid clad liquid metal is referred to as a strand.

Typically, the strand then passes into a secondary cooling zone and passes through a spray chamber where a cooling medium (e.g., water) is sprayed to further cool the metal. Examples of spraying technology used in spraying chambers are described in U.S. Pat. Nos. 4,699,202, 4,494,594, 4,444,495, 4,235,280, 3,981,347, 6,360,973, 7,905,271, and 8,216,117, which are incorporated herein by reference. After passing through the spray chamber, the metal further solidifies and may be cut into billets, blooms or slabs for shipping.

The environment in a continuous caster, including the spray chamber, can be highly corrosive. Corrosive conditions are associated with poor quality metal production, lost production time, increased maintenance costs and downtime, damage to the caster and pipes, and increased safety risks to operators.

Conditions in the caster may be monitored to determine optimal metal (e.g., steel) manufacture and avoid breaks in production. Monitoring conditions in the upper zone of the spray chamber is complicated, however, by extreme high temperatures (e.g., above 1,500° C.), extreme pH, inaccessibility to this zone during production, and the presence of particulate debris from the metal production that have a high tendency to agglomerate.

There is a need for alternative solutions to reduce corrosion and remove particle debris formed in spray chambers of continuous casters. Additionally, a need exists for improved systems and methods for monitoring spray chambers during operation.

Discussion of any references in this patent application provides context for the present disclosure and is not an admission that any such reference or references constitutes "prior art" to the claimed invention.

BRIEF SUMMARY

A system is disclosed for treating cooling fluid in a continuous metal casting process having a spray chamber.

In one embodiment, the system includes a first compartment with an intermittently operable outlet with an open state and a closed state, for removing particulate matter, and a second compartment that receives particle-free fluid from the first compartment. In some embodiments, the outlet includes a valve. In some embodiments, a first compartment has a tapered, conical, funnel, pyramidal shape or otherwise narrowed shape that facilitates settling of the particles. Particle-free fluid may be recycled to the spray chamber.

In some embodiments, one or more sensors measure at least one property of the particle-free fluid, such as corrosivity, pH, or temperature. The one or more sensors and outlet (with or without a valve) may be in communication with a controller, the controller actuated algorithmically to determine the opened or closed state of the outlet.

In one aspect, methods are disclosed for treating cooling fluid in a continuous metal casting process having a spray chamber.

In one embodiment, the method comprises providing a first compartment coupled to a spray chamber, the first compartment including an outlet intermittently operable to remove particulate matter from the cooling fluid, and providing a second compartment operable to receive particle-free fluid from the first compartment, the second compartment in communication with one or more sensors to measure at least one property of the particle-free fluid.

In one embodiment, the method comprises configuring a first compartment to a spray chamber, the first compartment having an outlet intermittently operable between an opened state and a closed state; receiving cooling fluid in the first compartment; settling particulate matter from the cooling fluid and opening the outlet to remove the particulate matter; flowing the particle-free fluid to a second compartment including one or more sensors to measure at least one property of the particle-free fluid; measuring the at least one property of the particle-free fluid; when the at least one property is outside of an acceptable range, and varying the amount of a chemical flowing into the cooling fluid or the particle-free fluid. In some embodiments, a first compartment has a tapered, conical, funnel, pyramidal shape or otherwise narrowed shape that facilitates settling of the particles.

In some embodiments, the system and methods indirectly reduce corrosion in spray chambers.

The foregoing has broadly outlined the features and technical advantages of the present disclosure in order that the detailed description that follows may be better understood. Additional features and advantages of the disclosure will be described hereinafter that form the subject of the claims of this application. The person of skill in the art will recognize that the conception and specific embodiments disclosed herein may be utilized as a basis for modifying or designing other embodiments for carrying out the same purposes of the present disclosure. The person of skill in the art will understand that other and additional embodiments may exist within the spirit and scope of the present disclosure as set forth in the appended claims.

BRIEF DESCRIPTION OF THE DRAWINGS

A detailed description of the invention is hereafter described with specific reference to the following drawings, in which.

DETAILED DESCRIPTION

Figure 1:
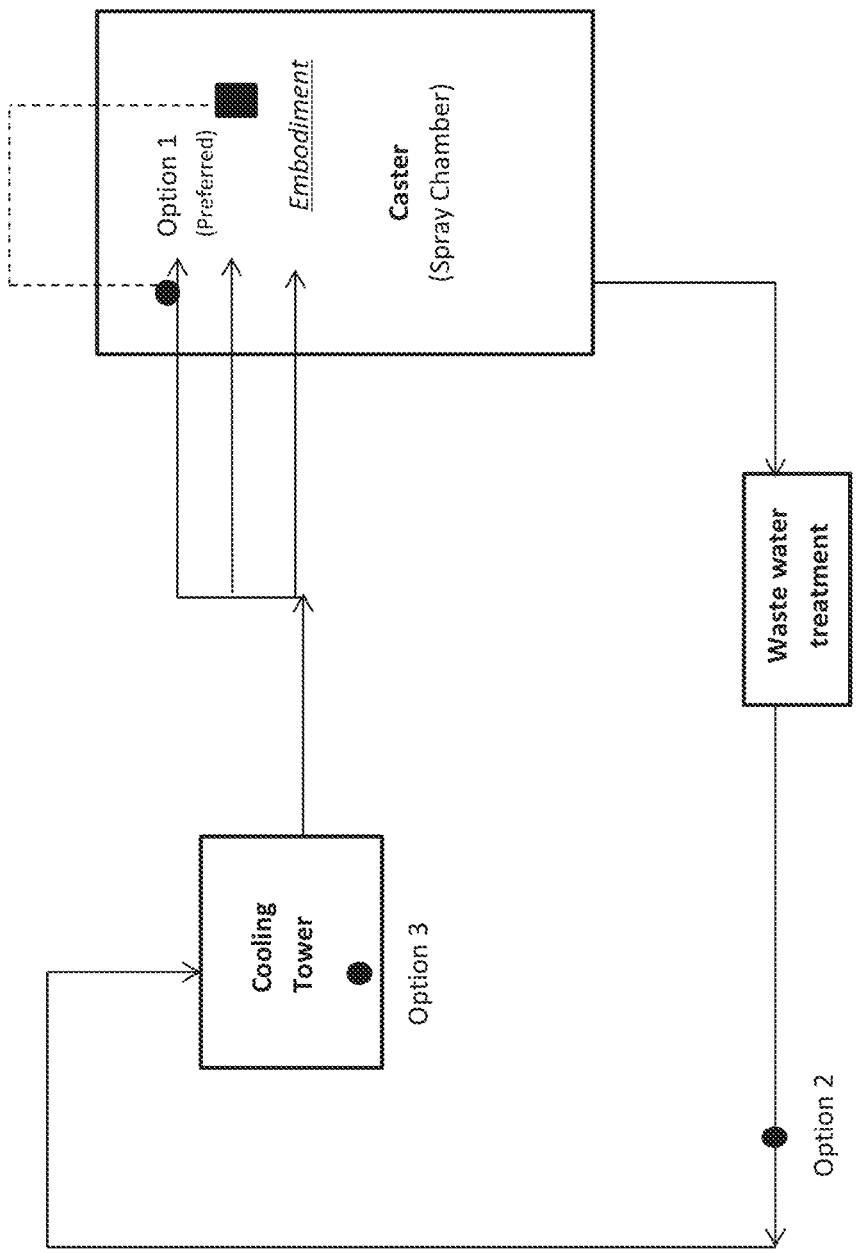
FIGS. 1 and 2 are generalized process diagrams illustrating embodiments of the invention.

The disclosure relates to systems, devices, and methods useful for reducing corrosion in continuous metal (including steel) casters, with the aim of reducing the total cost of operation. A system is disclosed for sampling spray water from a spray chamber of a continuous metal caster, monitoring the spray water for corrosivity and other parameters, and removing debris.

It is thus a goal of the invention to reduce corrosion in a metal caster and to extend the period of continuous operation before maintenance is required. In order to limit corrosion in continuous metal casters, it is important to regularly monitor the water in the upper zone of the spray chamber. Continuous monitoring provides real-time information about conditions in the caster which can be used to adjust the dosage of chemicals to locally control corrosion. Extreme conditions in the caster make direct monitoring difficult, however.

Another complication of metal casting is the formation of particulate debris (sometimes called sinter), which has a tendency to agglomerate, eroding, the caster and associated conduits. Periodic equipment shutdown is required to remove this debris, further reducing production efficiency. Furthermore, this debris fouls monitoring equipment, reducing the ability to monitor and regulate conditions in the caster in real time.

Thus, in one aspect, a system is disclosed for continuously sampling spray water from the upper zone of a spray chamber, monitoring corrosivity, and removing debris from the spray water. An outlet facilitates periodic removal of the settled particulate matter. The outlet may be intermittently operable, having an opened state and a closed state. The opened state and closed state may be regulated using a valve. The valve may be a pinch-type valve. The open state and closed state of the outlet and adjustment of conditions in the spray chamber can be automated and controlled using algorithms. Using the system disclosed herein, sampling, monitoring, and particle removal may be conducted during operation of a metal caster, allowing continuous operation of the caster.

Reference herein to a continuous metal caster or continuous metal casting is understood to include and encompass any form of metal casting suitable for the disclosed systems and methods, including continuous casting of steel, aluminum, copper, or any other metal so produced.

As used herein, the term "spray water" means water used as a cooling fluid in a continuous metal caster. More specifically, "spray water" refers to water used in a spray chamber of a continuous metal caster, though it may also refer to water used as a cooling fluid in other parts of the caster. The term "cooling fluid" or "cooling medium" is thus used interchangeably with the term "spray water" in some parts of the disclosure.

As used herein, the term "particle free fluid" means cooling fluid that has been processed such that most or all of the insoluble particles and sinter material in the cooling fluid have been removed, particularly cooling fluid that has been used in a spray chamber and subsequently processed to remove such particles. It is understood that "particle-free" fluid may retain some particulate matter and/or sinter material, but at significantly lower levels than a corresponding cooling fluid obtained from the same caster prior to settling and removal of particles.

As used herein, the term "treated fluid" may refer to fluid that has been modified by addition or removal of agents to alter its chemical composition. More specifically, "treated fluid" may be used herein to refer to cooling fluid that has been treated by varying the amount of a chemical in a cooling fluid, as further detailed herein As used herein, the term "first compartment" may be used interchangeably with the terms "settling compartment" or "settling tank" and, unless otherwise specified, refers to the compartment in which particulate matter separates or settles from spray water, and can subsequently be collected, according to the disclosed system and methods.

As used herein, the term "second compartment" may be used interchangeably with the terms "sensor compartment" or "sensor tank" and, unless otherwise specified, is the compartment in which various parameters, such as temperature, pH, and corrosion, are measured in the spray water (generally now particle-free) according to the disclosed system and methods.

While a first compartment and a second compartment may be generally described as chambers or tanks, it is also understood that a pipe or pipes, a rack (e.g. a series of bent pipes of various configuration), or other generally hollow structure may be used according to certain embodiments herein, in keeping with the overall purpose of the invention.

Various parameters are appropriate for monitoring in spray water obtained from a spray chamber. These parameters include pH, temperature, corrosion rate, conductivity, oxidation/reduction potential, biocide concentration, turbidity, flow, dissolved oxygen, total suspended solids, ion concentration, and total dissolved solids. For example, local drops in pH in the upper zone of the spray chamber are common in metal casting, and are associated with increased corrosion potential in this zone.

It is understood that additional compartments may be utilized according to the systems and methods disclosed herein, either between a settling compartment and a sensor compartment, or in other areas of the system (e.g., for collecting particulate matter as it leaves a first compartment). In addition, each of the first compartment and second compartment, as defined hereinabove, may themselves be subdivided into sub-compartments, without departing from the spirit and scope of the claimed invention.

The present disclosure provides several advantages over the art, including longer periods of continuous, autonomous operation of a metal caster, as compared to traditional casting systems. For example, use of the systems and methods disclosed herein may permit autonomous operation for 30 days or more, with minimal accumulation of sinter in the sampling equipment. Similarly, the systems and methods disclosed may permit continuous and reliable monitoring of a variety of important operational parameters for 30 days or more. The disclosed systems and methods may detect production stops based on such parameters as temperature measurements, fluid volume, fluid weight, flow rate, and turbidity. Significantly, monitoring can be tied to automatic controllers that remove particulate debris and add agents needed to adjust conditions in the caster/spray chamber, with minimal need for user intervention. In certain embodiments, the controllers are actuated using algorithms and/or computerized models, reducing the need for human intervention.

In one embodiment, a system is disclosed for treating cooling fluid in a continuous metal casting process having a spray chamber, the system comprising a first compartment fluidly coupled to the spray chamber, the first compartment including an outlet having an open state and a closed state, the outlet intermittently operable to remove particulate matter and cooling fluid from the first compartment when the outlet is in the open state and to retain particulate matter and cooling fluid in the first compartment when the outlet is in the closed state; and a second compartment fluidly coupled to the first compartment, the second compartment operable to receive particle-free fluid from the first compartment.

In some embodiments, the first compartment thus functions as a settling tank for particulate matter contained in the spray water. Particulate matter settles in the first compartment/settling tank and may be drained (i.e., removed) at various intervals to prevent clogging.

In some embodiments, a valve is used to regulate the open state and closed state at the outlet and to remove particulate matter from a first compartment. The valve is intermittently operable, with an open position and a closed position. The valve can thus be opened as particulate matter accumulates in the first chamber. Both particulate matter and cooling fluid are removed from the first compartment when the valve is in the open position.

In some embodiments, the system is configured to allow a particle-free fluid to flow from a first compartment to a second compartment. In particular embodiments, flow of the particle-free fluid involves overflow of a particle-free fluid from the first compartment to the second compartment. For example, a particle-free fluid may fill a first compartment or reach a threshold level (e.g., "fill point") within the first compartment, at which stage particle-free fluid passes into one or more separate conduits, hoses, channels, pipes, or openings in fluid communication with a second compartment. The fluid at the upper end of the first compartment is expected to be relatively free of large and/or insoluble particles. In other embodiments, a particle-free fluid is routed from the first compartment into a second compartment.

In some embodiments, particle-free fluid overflows the first compartment as the first compartment reaches a fill point, and into a second compartment. Overflow has the advantage of being a simple and efficient mechanism for transferring particle-free fluid from the first compartment, while requiring minimal user intervention and energy expenditure. Overflow may be carried out after or while separating higher density particles (higher than water), for example, at the base of a first compartment. A rotatable bounded plate may be implemented to ensure separation of metal particles from the main stream. Overflow also has an advantage of providing a sample stream to monitor, allowing subsequent treatment of cooling fluid in or directed to the spray chamber. In certain embodiments, cooling fluid in the disclosed system is treated after leaving a first compartment and then recycled back to the spray chamber.

In some embodiments, a first compartment has a tapered, conical, funnel, pyramidal shape or otherwise narrowed shape that facilitates settling of the particles. Narrowing of the shape of the first compartment, particularly at the bottom section of the first compartment, helps heavier particles to collect near an outlet, where the particles may then be removed as, for example, by opening an outlet (e.g., a valve). The design may facilitate a self-cleaning function for the first compartment and provide certain advantages of convenience, low maintenance, and ease of use.

In some embodiments, a second compartment is in communication with one or more sensors operable to measure at least one property of the particle-free fluid. The at least one property may include conductivity, pH, oxidation/reduction potential, corrosion, biocide concentration, turbidity, temperature, flow, dissolved oxygen, total suspended solids, ion concentration, and total dissolved solids. Ion concentration may be measured using methods known in the art, including ion-sensitive probes (ISE sensors).

While various embodiments disclosed herein illustrate a first compartment disposed in series with (e.g., next to or adjacent to) a second compartment, a first compartment and a second compartment may also be arranged in other configurations consistent with the scope and spirit of the present disclosure. For example, a first compartment and a second compartment may be concentrically arranged, with a first compartment occupying an internal ring and a second compartment occupying an external concentric ring, or with a first compartment occupying an external ring and a second compartment occupying an internal concentric ring.

In some embodiments, a particle-free fluid is periodically withdrawn from a first compartment as a set volume of cooling fluid in the first compartment is reached, or as another desired parameter or parameters are reached. For example, a particle-free fluid may be withdrawn periodically (e.g., timed intervals, continuous, or manually determined). Monitoring of the system may be used to determine when to withdraw a particle-free fluid from a first compartment. In some embodiments, a valve is operably linked to a conduit, channel, pipe, or other opening in fluid communication with a second compartment, the valve controlled by a second controller under manual or automatic control.

In some embodiments, sensor readings are used to prompt the system to inject chemicals into the spray water to vary any of the measured properties of the spray water before returning it to the spray chamber. Sensor readings can also be used to adjust various operational parameters of the continuous metal caster, including conditions in the spray chamber, to maintain optimal and continuous operation.

The disclosed system can maintain the spray water properties within desired ranges autonomously for extended periods (e.g., 30 or more days).

In some embodiments, the pinch valve is operably linked to a controller. The controller may be automated. In this way, the first chamber may be automatically self-flushing.

In certain embodiments, one or more algorithms are used to analyze one or more parameters measured in the system and/or the metal caster, the algorithms determining appropriate times to open and close the outlet of the first compartment, add chemicals to the spray water, or otherwise adjust the operating conditions of the system and/or the metal to the cooling fluid, or otherwise regulate conditions in the system and/or metal caster. The algorithms may be operationally associated with the controller and other parts of the system and/or metal caster, with the goal of maintaining continuous operation of the metal caster for extended periods with minimal user intervention. The opening and closing function may be actuated, for example, using algorithms that correlate flow rate and/or temperature data from the first compartment and second compartment and adjust the frequency of duration of opening and closing accordingly.

Some embodiments of the invention are further described below. These embodiments are provided for illustration purposes only and are not intended to limit the scope of the invention in any way. Alternative embodiments may exist within the scope and spirit of the claimed invention, as defined more specifically in the attached claims.

Referring to FIG. 1, a system is described for treating cooling fluid in a continuous metal casting process. In the system, fresh spray water passes into a spray chamber-caster via a feedline and spray lines. Spray water from the upper (i.e., "top") zone of the spray chamber is collected by a water collector and directed to a monitoring system via a conduit. The monitoring system includes a first compartment for settling particulates and a second compartment for monitoring various parameters in the particle-free fluid (discussed further hereafter).

A stream passing from the monitoring system and containing relatively particle-free water or particle-free water laden with debris may be joined with a discharge stream exiting a lower end of the spray chamber and containing high particle content, with the combined stream passing into a waste-water treatment area and potentially a sand filter for further treatment. The resulting stream may then be passed into a cooling tower for potential recycling back to the spray chamber.

Various parameters, such as temperature, volume, turbidity and particle concentration, may be measured within the monitoring system and converted into an electrical signal. A controller may be used to actuate addition of a chemical at one of various locations along the fluid path described herein (Option 1, Option 2, or Option 3 of FIG. 1). Preferably, chemical addition occurs in the spray lines (Option 1), but chemicals may also be added following water treatment and filtration, or within the cooling tower.

Figure 2:
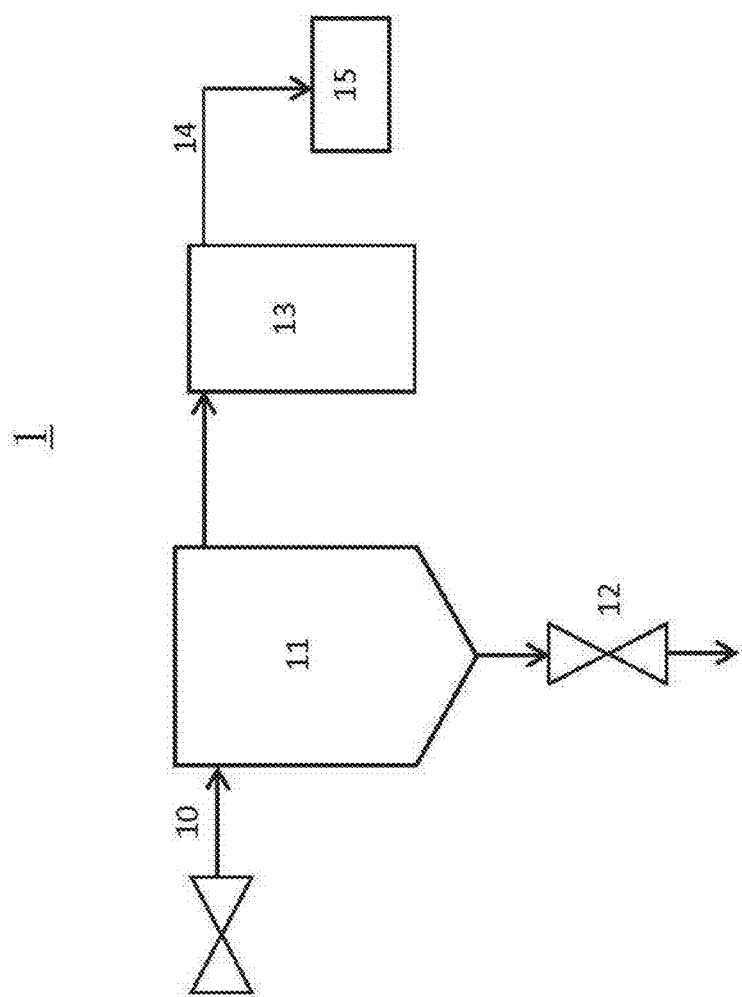

FIG. 2 generally describes system 1 for treating cooling fluid in a continuous metal casting process. In system 1, spray water from the upper (i.e., "top") zone of a spray chamber of a continuous metal caster is directed to first compartment 11 via conduit 10. An outlet (e.g., valve) with an open position and a closed position may be used to determine when to permit flow of the spray water into system 1. The valve may be automated or manually controlled.

First compartment 11 serves as a settling compartment, allowing particulate matter to separate from the cooling fluid. First compartment 11 is generally conical-shaped or pyramidal-shaped to facilitate settling and collection of particulate matter at the bottom of the compartment. First compartment 11 is fluidly connected to an outlet, such as a valve, which may be a pinch valve 12, having an open position and a closed position. Pinch valve 12 is intermittently operable to remove particulate matter and cooling fluid from the base of first compartment 11 when pinch valve 12 is in the open position and to retain particulate matter and cooling fluid in first compartment 11 when pinch valve 12 is in the closed position. Pinch valve 12 may be automated. As used herein, "automated pinch valve" refers to a valve that is operable without human intervention. Pinch valve 12 may be opened and closed at regular, timed intervals based on a preset program, or may be opened and closed based on measured parameters in the continuous steel caster or system 1. Pinch valve 12 may also be controlled by a control board (not shown). Particulate matter may thus periodically be removed from first compartment 11 by the operation of pinch valve 12 for later storage or disposal, with little or no intervention required from a human operator. While pinch valve 12 does not require human intervention, it may be operated or overridden by a human and still be considered "automated," particularly where its operation does not necessarily require such intervention.

By opening and closing at particular intervals or in response to particular parameters, pinch valve 12 may serve to accumulate particulates and self-flush them automatically from system 1.

Particle-free fluid from first compartment 11 flows (e.g., is routed or overflows) to second compartment 13, where sensors (not shown) monitor various parameters in the particle-free fluid, such as pH, corrosion, and temperature. Particle-free fluid may then pass from second compartment 13 via overflow 14 or other means to enter retention compartment 15, to be later discarded or recycled back to the spray chamber.

Figure 3:
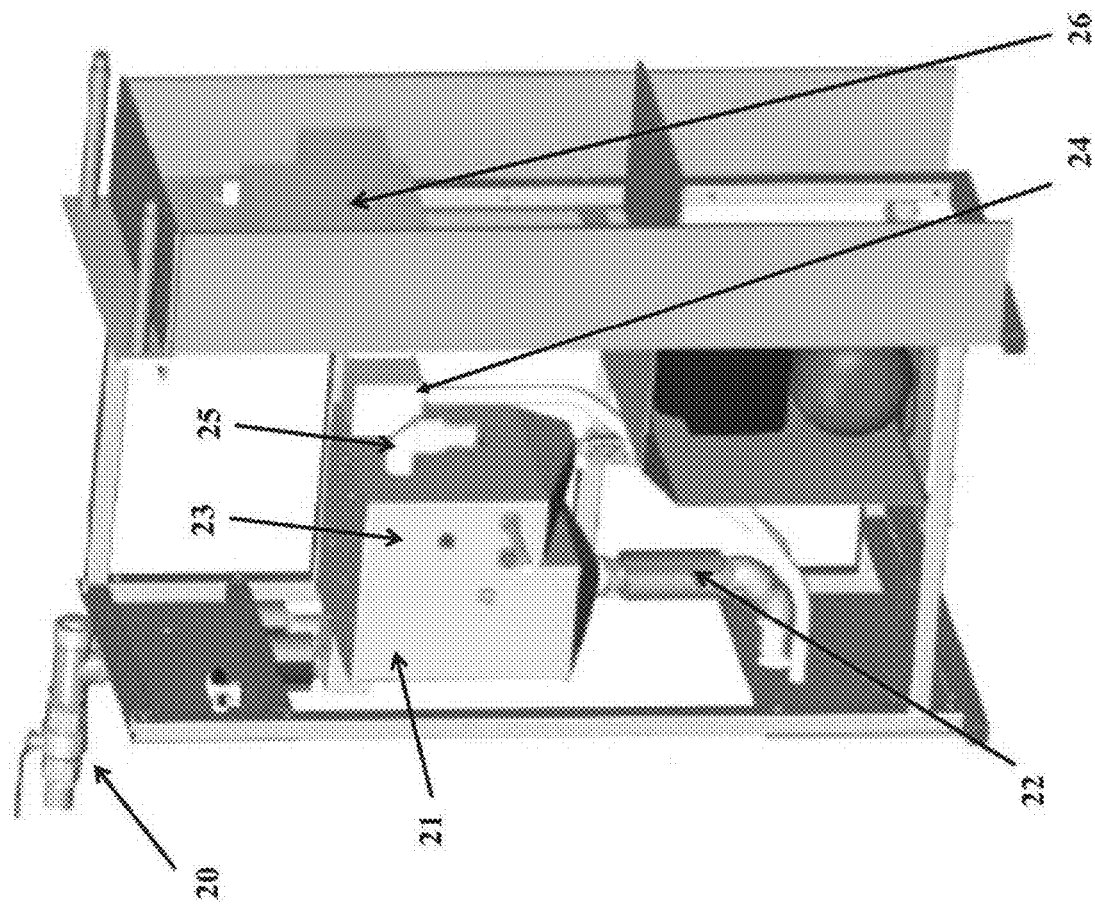
FIG. 3 is an illustration showing parts of a caster monitoring system, according to some embodiments of the invention.
Figure 4:
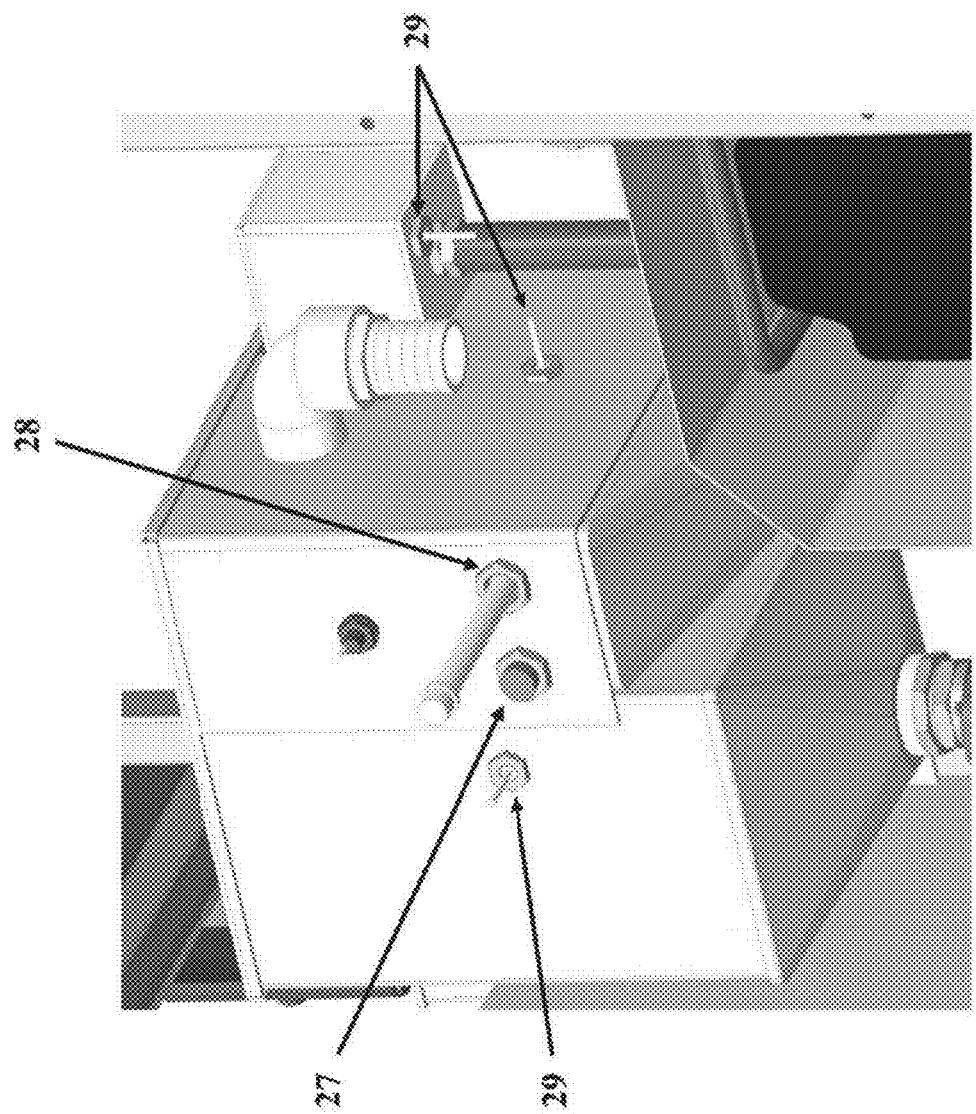
FIGS. 4 and 5 are illustrations showing an enlargement of the two-compartment design of a caster monitoring system, as shown in FIG. 3, according to some embodiments of the invention.
Figure 5:
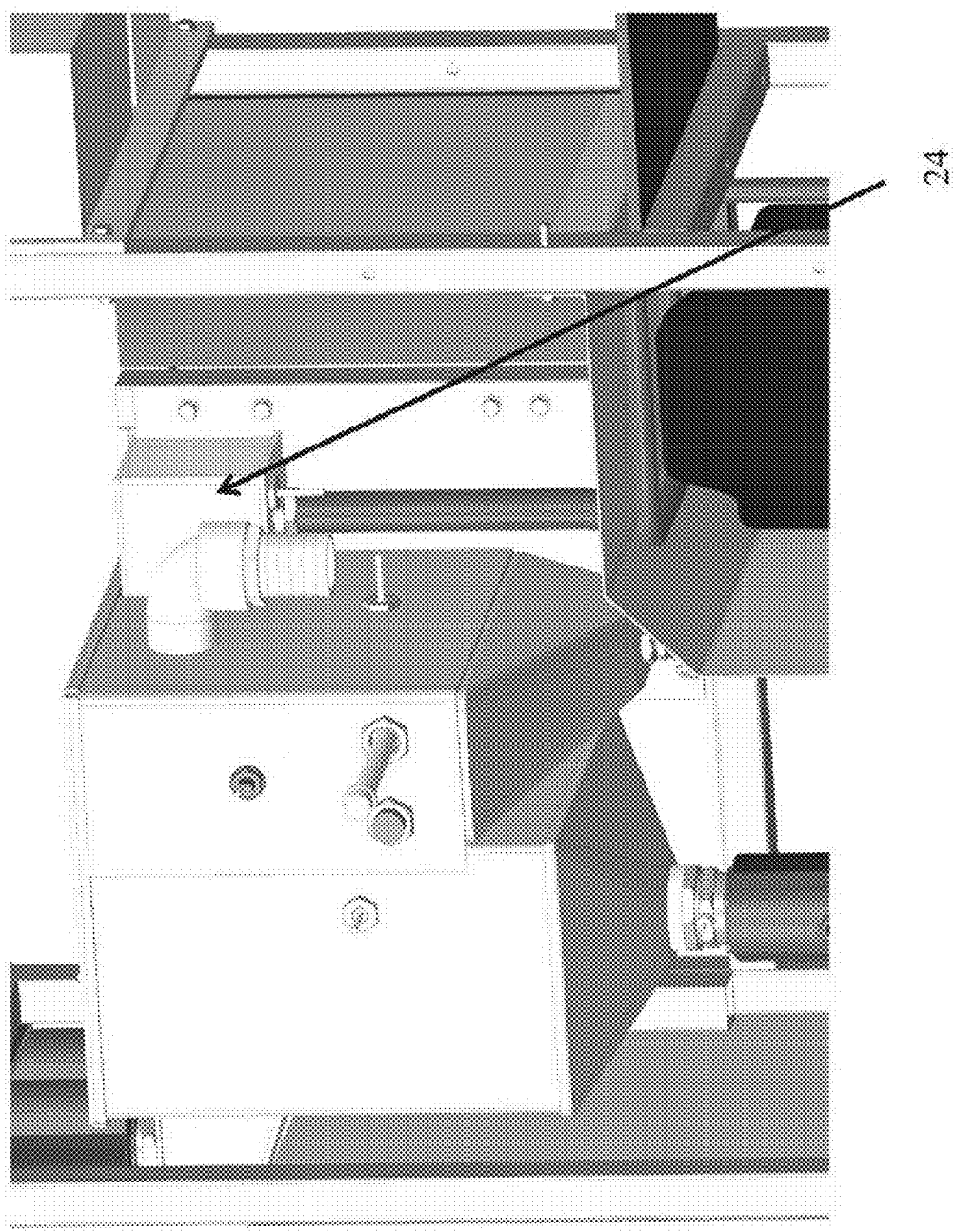

FIGS. 3-5 illustrate a caster monitoring system according to some embodiments of the invention. Referring to FIG. 3, inlet ball valve 20 regulates flow of spray water (i.e., cooling fluid) from the upper zone of a spray chamber of a continuous metal caster into the system. When inlet ball valve 20 is open, spray water enters first compartment 21, where particulate matter settles. The settled particles are periodically flushed by opening automated pinch valve 22 at the bottom of first compartment 21. Particle-free fluid overflows (not shown) to second compartment 23. A separate overflow 24 and emergency overflow 25 permit excess particle-free fluid to flow from second compartment 23. Monitoring board 26 monitors and integrates various parameters in the spray water at different stages of the system using a variety of sensors. Monitoring board 26 may include or be configured to interact with a controller that exerts operational control over various functions, such as opening/closing of inlet ball valve 20, opening/closing of automated pinch valve 22, addition of various chemical additives to the spray water, or adjustments in operational parameters in the spray chamber and/or metal caster generally.

Referring to FIG. 4, corrosion monitor 27 measures corrosion, and pH meter 28 measures pH, in second compartment 23. Temperature sensors 29 continuously measure temperature at different zones of the system, including first compartment 21, second compartment 23, and overflow 24. For example, temperature sensors may be situated in first (settling) compartment 21; in second (sensor) compartment 23 to determine the temperature at the pH and corrosion sensors and permit correction of their readings; at the outlet section of the system, to measure temperature in the outlet flow; and/or at automated pinch valve 22 to detect if the drain is blocked. As described herein, the outlet of the system can refer to any of overflow 24, emergency overflow 25, or a separate output conduit, channel, or path (not shown) leading out of second compartment 23. For example, according to the embodiment in FIG. 5, an outlet temperature sensor may be present at overflow 24.

In some embodiments, the particle-free fluid has a flow rate from first compartment 21 to second compartment 23 of about 3 L/min to about 100 L/min. In particular embodiments, the flow rate is about 5 L/min to about 50 L/min. Generally, the disclosed system works more efficiently at higher flow rates.

A vacuum element may be utilized with an outlet for draining a first compartment of the disclosed system. For example, a vacuum element may be associated with an automated pinch valve 22 (FIG. 3), the vacuum element having an on position and an off position such that the vacuum element is operable in the off position when the valve is in the closed position and the vacuum element is operable in the on position when the valve is in the open position to remove the particulate matter.

In some embodiments, an automated pinch valve is operated in the open position and the vacuum element is operated in the on position at periodic intervals for about a one minute duration to permit drainage of particulate matter from the first compartment. In certain embodiments, the periodic intervals are selected from about 5 minutes to about 100 minutes, for example, about 15 minute intervals, but longer intervals are also possible, within the scope of the disclosure. The person of skill in the art will understand that the vacuum element and time intervals may be selected to optimize settling of particulates and the self-flushing functionality of the system. Other factors, such as flow rate, density of particles in the spray water, size and shape of the first compartment, and customer preference, may be considered in setting these intervals. It is thus an embodiment of the invention that the intervals are determined dynamically using algorithms that relate flow rate, temperature and other data in the system to set on/off time.

Thus, in a specific embodiment, a system is disclosed for treating cooling fluid in a continuous metal casting process having a spray chamber, the system including a first compartment fluidly coupled to the spray chamber, the first compartment including an pinch valve intermittently operable between an open position and a closed position, wherein particulate matter and cooling fluid passes from the first compartment when the valve is in the open position and is retained in the first compartment when the valve is in the closed position; a vacuum element having an on position and an off position such that the vacuum element is operable in the off position when the valve is in the closed position and the vacuum element is operable in the on position when the valve is in the open position to remove the particulate matter; and a second compartment fluidly coupled to the first compartment, the second compartment operable to receive particle-free fluid from the first compartment.

Thus, a controller may be in communication with an automated pinch valve, temperature sensors, and an alarm, the temperature sensor operable to determine the temperature of the cooling fluid, and the alarm operable to indicate when the temperature is outside of an acceptable limit. In this manner, the operation (opening/closing) of the automated pinch valve can be modified in response to dynamic changes in the system.

In certain embodiments, one or more pumps are in communication with the controller, wherein the one or more pumps are configured to inject at least one chemical into the particle-free fluid to vary the at least one property of the particle-free fluid, forming a treated fluid. The treated fluid may then be recycled to the metal caster, influencing conditions therein.

In one aspect, methods are disclosed for treating cooling fluid in a continuous metal casting process having a spray chamber.

In one embodiment, the method includes providing a first compartment coupled to a spray chamber, wherein the first compartment includes an outlet having an open state and a closed state, the outlet operable to remove particulate matter from the first compartment and the cooling fluid when in the open state, defining particle-free fluid, and the outlet retaining the particulate matter in the first compartment and the cooling fluid when in the closed state; and providing a second compartment fluidly coupled to the first compartment, the second compartment operable to receive the particle-free fluid from the first compartment, the second compartment in communication with a one or more sensors operable to measure at least one property of the particle-free fluid such that the particle-free fluid can be reused during the continuous metal casting process.

In another embodiment, the method includes configuring a first compartment to a spray chamber, wherein the first compartment includes a valve having an open position and a closed position; receiving cooling fluid including particulate matter in the first compartment; settling the particulate matter from the cooling fluid such that the particulate matter contacts a valve having an open position and a closed position; operating the valve in the open position to remove the particulate matter from the cooling fluid and the first compartment to produce particle-free fluid; flowing the particle-free fluid from the first compartment to a second compartment including one or more sensors operable to measure at least one property of the particle-free fluid; measuring the at least one property of the particle-free fluid with the one or more sensors; determining if the at least one property is within an acceptable range; when the at least one property is outside of the acceptable range, varying the amount of a chemical flowing into the particle-free fluid, the chemical capable of adjusting the at least one property to bring the at least one property within the acceptable range, defining treated fluid; and reusing the treated fluid in the continuous metal casting process.

In certain embodiments, receiving cooling fluid including particulate matter in the first compartment includes receiving cooling fluid in a funnel from an upper zone of the spray chamber, the funnel coupled to a hose such that the funnel and hose are fluidly coupled to the first compartment.

A vacuum element may be used in communication with the outlet and/or valve to suction the particulate matter from the first compartment, and the outlet and/or valve and vacuum element may be operated intermittently and together with each other. In certain embodiments, the outlet and/or valve is in fluid communication with a drain. In this way, the outlet and/or valve and vacuum element facilitate a self-flushing (cleaning) function of the system.

In particular embodiments, operating the outlet and/or valve and vacuum element intermittently includes operating the outlet and/or valve and vacuum element at 10-100 minute intervals for a 1 minute duration. In particular embodiments, the valve and vacuum element operate in 15 minute intervals for a 1 minute duration. In a preferred embodiment, the intervals are determined algorithmically, based on flow rates, temperature, turbidity, and/or other factors measured in the system, as disclosed herein.

For example, according to one generalized algorithm, the opening frequency of an outlet and/or valve in the first compartment may be reduced when $T_{inlet} > 35°$ C. and $T_{inlet} - T_{outlet} > 8-15°$ C.

Alternatively, the opening frequency of the outlet and/or valve in the first compartment may be reduced when $T_{inlet} > 35°$ C. and flow falls below a threshold value.

EXAMPLES

Validation of a Caster Monitoring Tool Under Field Conditions.

The machinery and superstructure in the spray chamber of slab continuous casters suffer from high corrosion. The applicant is currently working on a program to lower the corrosion on this part of a caster. A key part of the program is a reliable corrosion monitoring tool. This tool is used to monitor and control the corrosivity of the water in the upper zone of the spray chamber, where local frequent pH drops increase the corrosion potential in this zone.

A caster monitoring tool was designed and developed to monitor the quality of spray water collected from the upper zone of a spray chamber of a continuous metal caster. The monitoring tool is capable of autonomously sampling water containing high load of debris/sinter from the upper zone of a spray chamber, separating the debris, and producing a clean water stream that is monitored using different sensors. This device operates based on an automated valve that periodically opens to drain collected debris in a settling chamber. Four key performance indicators were evaluated:

Autonomous operation for 30 days with minimal accumulation of sinter in the sampling equipment;
Continuous and reliable monitoring of pH, temperature and corrosion rate for 30 days;
Detection of production stops based on temperature measurements; and
Ability to detect overflow from the first compartment to the second compartment.

Sprayed water was collected behind segment 1 during production with a stainless steel funnel (60×60×100 cm; Body: 500 cm, 37 cm height). A filter of a pyramidal shape (55×55×18 cm) was installed on top of the funnel to filter out particles larger than 1 cm. The water with sinter was canalized outside the spray chamber with 14 m EPDM hose (2 inch inside diameter) to the inside of the corrosion monitoring tool. The outlet flow and drain recycled fluid back to the spray chamber.

A Schubert & Salzer control valve was used in the initial installation for draining the sinter. This was replaced by an AKO VMC automatic pinch valve to maximize the inner diameter of the valve when opened.

The caster monitoring tool was designed with two separate compartments. Water enters the first compartment, where the sinter settles. See FIGS. 3-5. Settled particles were periodically flushed using an automated pinch valve. The particle-free water stream overflowed to the second compartment. In the second compartment, a corrosion monitor, pH meter, and temperature sensor were installed for continuous monitoring. See FIGS. 3-5. Data was logged using a controller.

Three temperature sensors were installed in different zones of the equipment:

Temperature sensor in the first (settling) compartment ($T_{inlet}$): This sensor is installed 15 cm from the bottom of the setting tank and gets wet when water enters the sensor compartment.
Temperature sensor installed in the second (sensor) compartment ($T_{sensor}$): This sensor indicates the temperature at which the sensors (pH and corrosion) are measuring. This temperature can be used to correct the pH reading.
Temperature sensor installed at the outlet section at overflow 24 ($T_{outlet}$): This sensor detects and measures flow in the outlet.

The automated pinch valve on the outlet was actuated by a solenoid valve and a timer. The timer of the pinch valve can be manually adjusted to vary the residence time of the water inside the equipment. During testing, the pinch valve was opened every 15 min and kept opened for 1 minute to ensure that all the settled debris was well flushed. A vacuum system was coupled to the pinch valve and actuated at the same time to maximize the opening of the valve.

Water samples from the caster monitoring tool were taken twice a week to validate the pH measurements recorded on a controller. In parallel, temperatures, water flow, and particle settling was visually monitored to evaluate the dynamics of the water inside the equipment during production.

KPI 1: Autonomous operation for 30 days with minimal accumulation of sinter in the sampling equipment.

The design of the settling tank proved to be suitable to settle sinter from the water stream collected from the spray chamber. Clear water overflowed from the settling tank to the sensor compartment with minimum sinter depositing in the sensor compartment.

The use of an AKO VMC automated pinch valve with a vacuum unit attached allowed the inner diameter of the valve opening to be maximized. This effectively prevented clogging of the valve. Every 15 min, the pinch valve opened for 1 minute and the valve was vacuumed with −1 bar to maintain the inside diameter at 2 inches.

The inside of the equipment was cleaned only once per month. Overall, the sinter effectively settled and was drained by the automated valve with only minimum maintenance. These results validate the first KPI.

KPI 2. Continuous and reliable monitoring of pH, temperature and corrosion rate for 30 days.

The pH, temperature and corrosion of the cooling fluid were monitored every 5 minutes with the controller.

Figure 6:
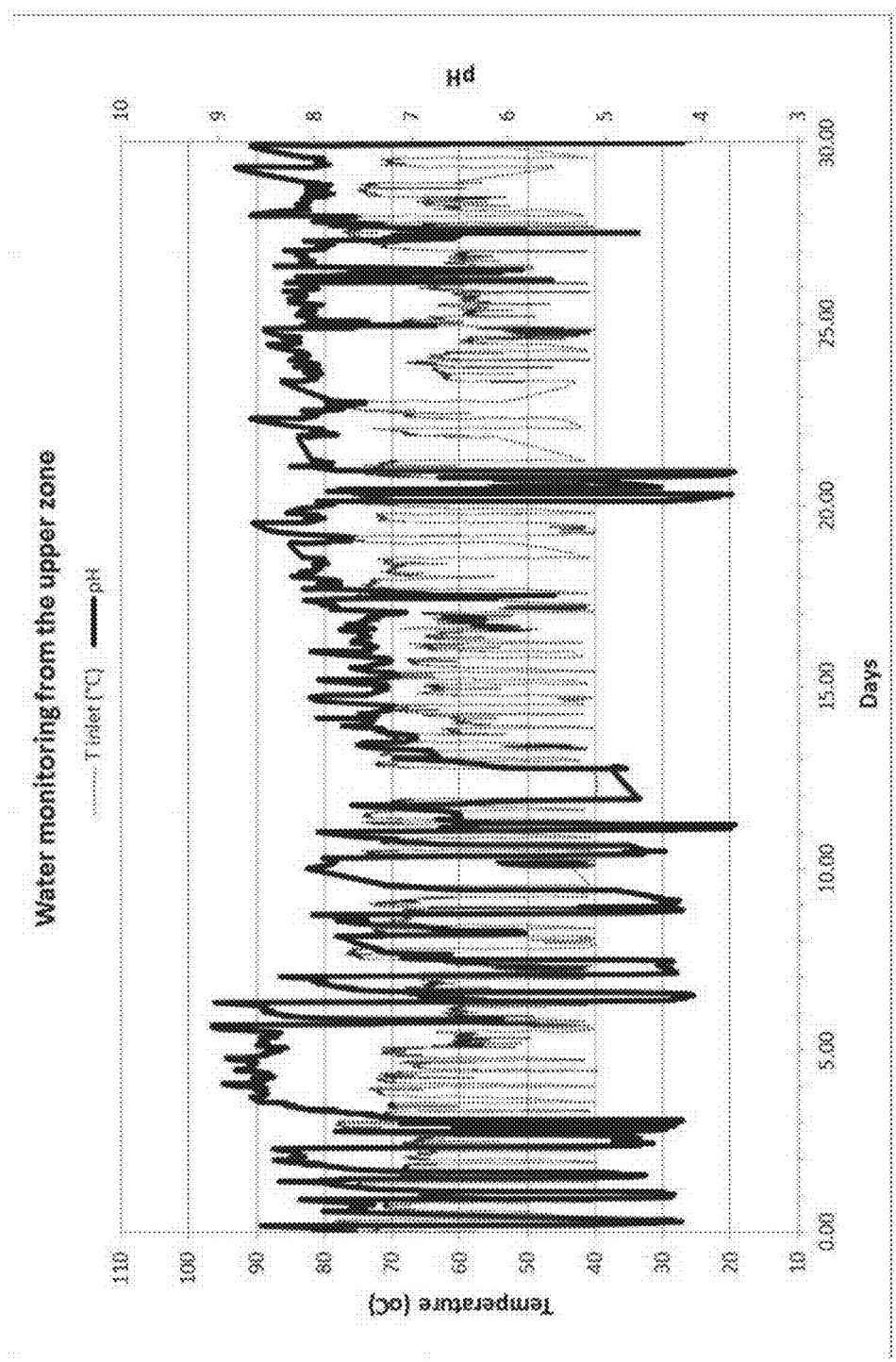
FIG. 6 is a graph showing pH and temperature in water obtained from the upper (top) zone of a continuous metal caster, using an embodiment of the disclosed system.

FIG. 6 illustrates pH vs. temperature in the settling tank during production ($T_{inlet}$>40° C.). pH (bold/continuous line) readings were measured every 5 minutes. The pH of the water collected from the spray chamber varied from 3.9 to 8.5, depending on the casting conditions. The design of the equipment allowed easy calibration of the probe as needed. Frequent cleaning and calibration of a pH probe is expected with this type of water due to formation of deposits on the probe surface. Water samples were taken to verify the monitored values with the controller and the unit was calibrated as needed.

As shown in FIG. 6, the system was able to collect reliable pH data for more than one month. The pH probe was also able to withstand swings in temperature from room temperature to 80° C. (dotted line).

Figure 7:
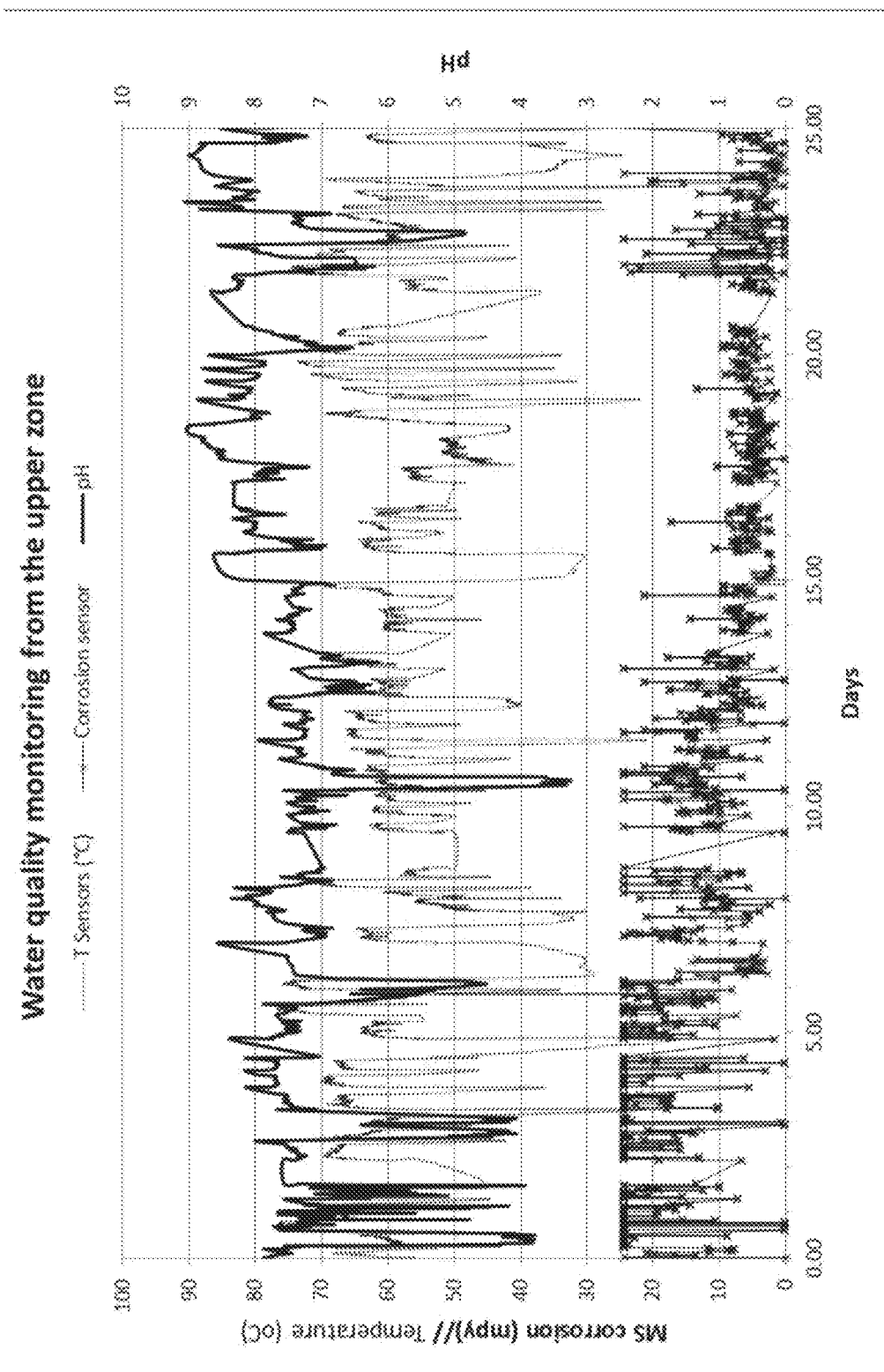
FIG. 7 is a graph showing pH, online corrosion, and temperature in water obtained from the upper (top) zone of a continuous metal caster, using an embodiment of the disclosed system.

FIG. 7 is a plot showing pH, online corrosion, and temperature during production ($T_{inlet}$>40° C.). FIG. 7 shows the corrosion reading over time (line with "x" marks), expressed in mili-inches per year (mpy). As shown, high temperatures (dotted line) and low pH (bold/continuous line) correlated with an increased corrosion rate. The monitoring device proved suitable to indicate changes in corrosivity of the sampled water inside the spray chamber.

Temperature in the inlet, sensor chamber, and outlet was continuously recorded, without any issues. This data is needed to correct the pH measurements and to detect overflow from one section of the equipment to the next. Temperature is also a key parameter to monitor because of its impact on corrosion.

The results for pH, temperature, and corrosion validate the operation of the system related to KPI 2, giving continuous and reliable data of these parameters for over one month.

KPI 3. Detection of production stops based on temperature measurements.

Figure 8:
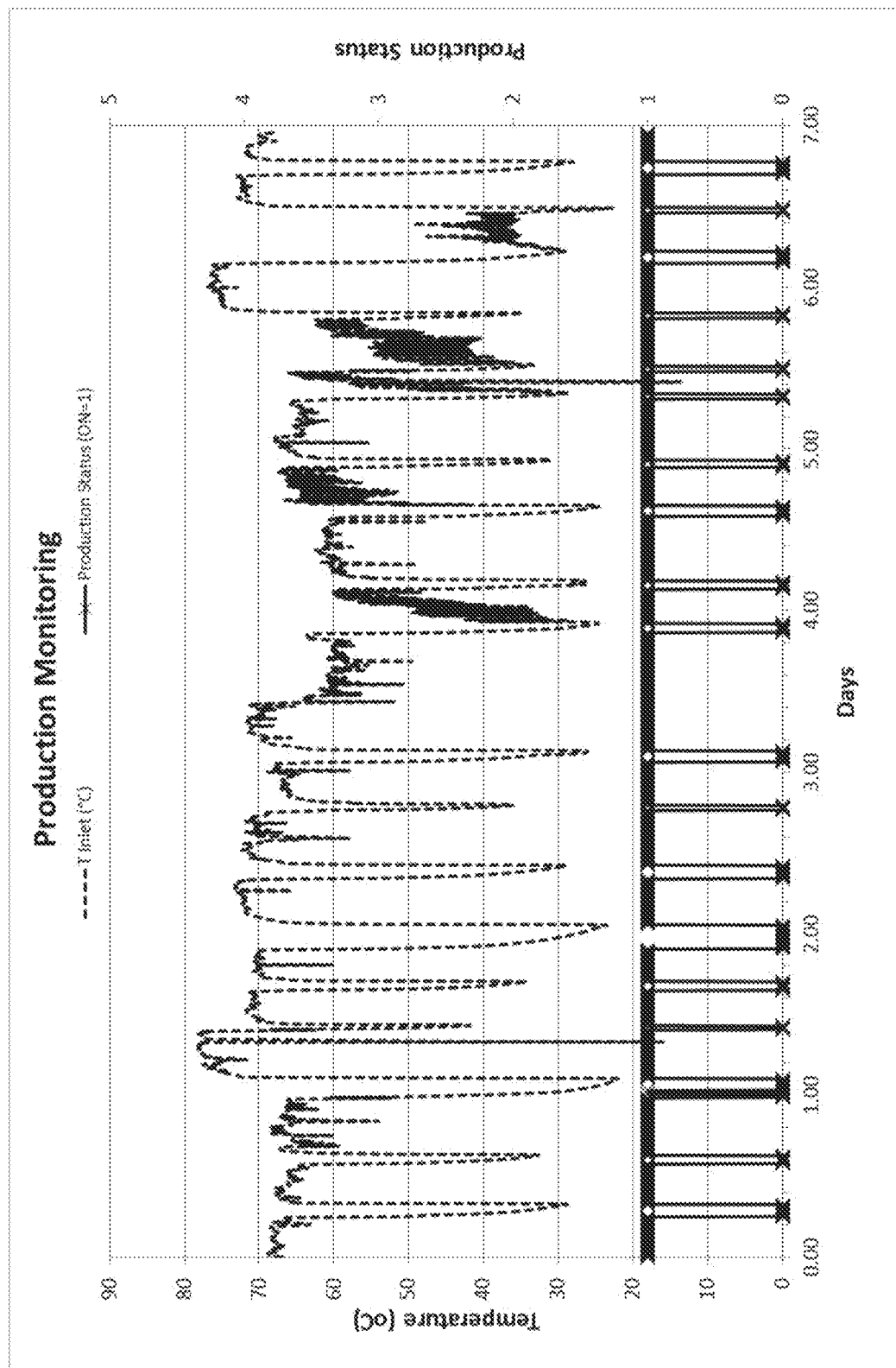
FIG. 8 is a graph correlating temperature monitored inside a settling tank (first compartment) and production status, using an embodiment of the disclosed system.

FIG. 8 compares the temperature inside the settling tank ($T_{inlet}$) (dashed line), with production status in the metal caster.

The production (bold/continuous line) in FIG. 8 indicates with values of 1 that the caster was producing based on spray flow data over a seven day sample period. Within 56 days, a $T_{inlet}$ above 40° C. corresponded to production 94.99% of the time. This value of 40° C. could therefore be used to monitor production with a high level of accuracy and validates the operation of the system related to KPI 3.

KPI 4. Ability to detect overflow from the first compartment to second compartment.

Water flow during production varies depending on the steel grade manufactured. In order to obtain reliable data, it is therefore important to detect if flow is high enough to have overflow from the settling tank to the sensor tank.

Data obtained from the corrosion monitoring tool showed that for temperatures above 40° C. (production), the difference between $T_{outlet}$ and $T_{inlet}$ could be used to detect overflow. A difference above 10° C. indicated no overflow.

Figure 9:
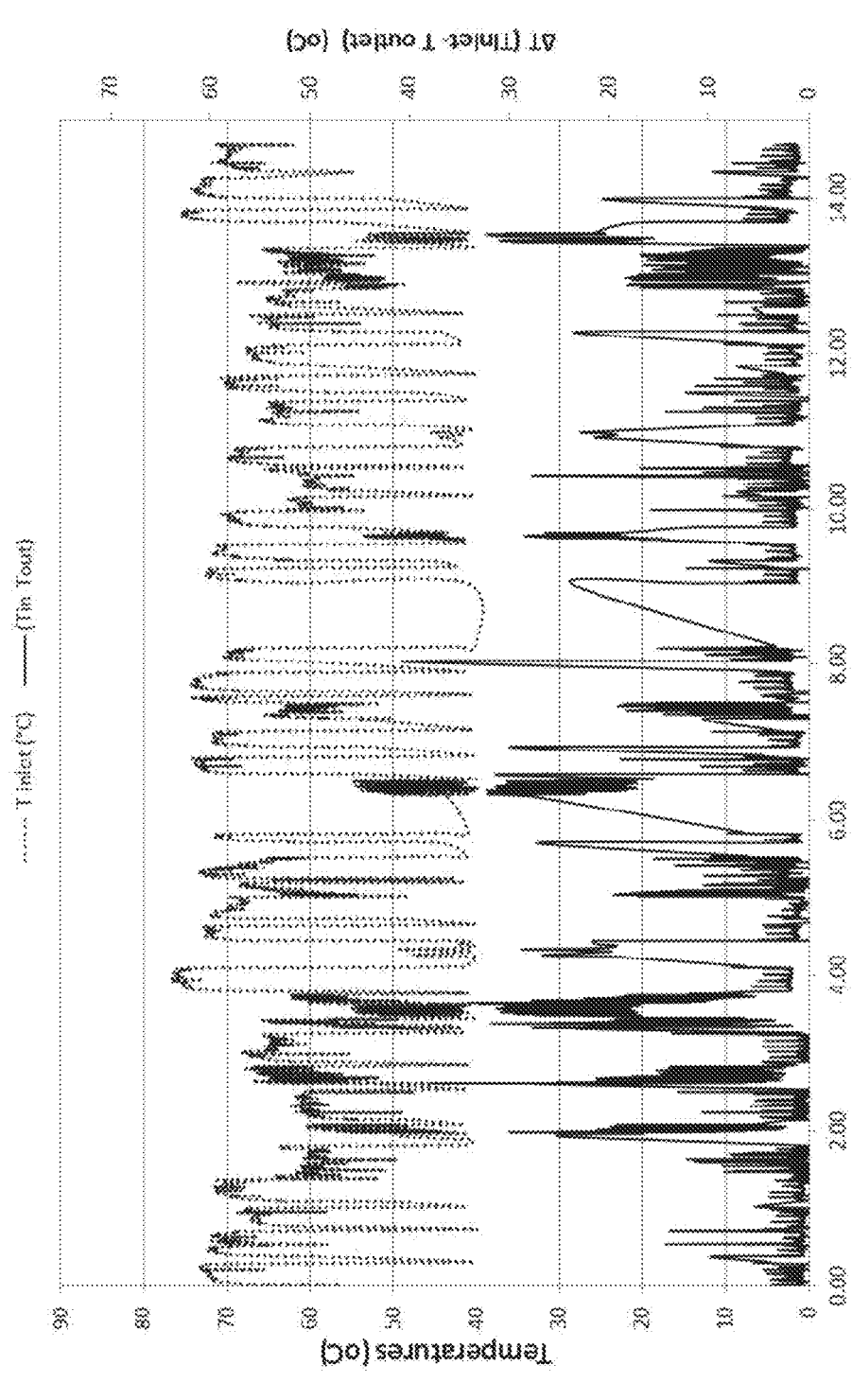
FIG. 9 is a graph showing temperature inside the monitoring system using an embodiment of the disclosed system.

FIG. 9 shows water temperatures inside the monitoring equipment over time. The automated pinch valve was set with an opening frequency of 15 min and kept open for 1 minute.

In FIG. 9, the flow on day 3.5 and 7 was too low to overflow from the settling tank to the sensor compartment. Consequently, the temperature in the inlet (dotted line) was above 40° C., but the temperature at the outlet was lower. The difference between the two temperatures (Bold line) indicates the difference in flow.

These results meet the requirements for KPI 4.

Operational window.

Considering that the volume of the settling tank was 26.9 L, with an interval of 15 minutes for opening the pinch valve, it was recommended to have a minimum flow of 5.4 L/min so that the settling tank refills in a maximum of 5 min. Thus, an operational window of about 5.4 L/min to about 100 L/min was established.

The caster monitoring tool proved to be suitable for separating sinter particles from spray water and providing a clean stream that could be continuously monitored. The equipment reliably measured:

Representative pH and temperature of the collected water;
Production status, indicating, for example, when $T_{inlet}>40°$ C.;
Corrosivity of the water
Presence of overflow from the settling to the sensor compartment In addition, the caster monitoring tool can be used to locally control the pH of the upper zone of a spray chamber and consequently, reduce corrosion. The caster monitoring tool effectively extends the period between required maintenance, thus requiring maintenance only once per month (i.e., about 30 days), for example.

All of the devices, compositions and methods disclosed and claimed herein can be made and executed without undue experimentation in light of the present disclosure. While this invention may be embodied in many different forms, there are described in detail herein specific embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a device" is intended to include "at least one device" or "one or more devices."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all subranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

Any composition disclosed herein may comprise, consist of, or consist essentially of any of the compounds/components disclosed herein. In accordance with the present disclosure, the phrases "consist essentially of," "consists essentially of," "consisting essentially of," and the like limit the scope of a claim to the specified materials or steps and those materials or steps that do not materially affect the basic and novel characteristic(s) of the claimed invention.

What is claimed is:

1. A system for treating cooling fluid in a continuous metal casting process having a spray chamber, the system comprising:
    a first compartment fluidly coupled to the spray chamber, the first compartment including an outlet intermittently operable between an open state and a closed state, wherein particulate matter and cooling fluid passes from the first compartment when the outlet is in the open state and is retained in the first compartment when the outlet is in the closed state; and
    a second compartment fluidly coupled to the first compartment, the second compartment operable to receive particle-free fluid from the first compartment,
    wherein the outlet transitions between an open state and a closed state by operation of a valve located at the outlet, and the valve is in communication with a temperature sensor via a controller, the temperature sensor operable to determine the temperature of the cooling fluid, the valve transitioning between the open state and the closed state based on the temperature of the cooling fluid measured by the temperature sensor.

2. The system of claim 1, wherein the system is configured to allow the particle-free fluid to overflow from the first compartment to the second compartment.

3. The system of claim 1, wherein at least one of the first compartment or the second compartment comprises a rack or a pipe.

4. The system of claim 1, wherein the second compartment is in communication with one or more sensors operable to measure at least one property of the particle-free fluid.

5. The system of claim 4, wherein the at least one property is selected from the group consisting of conductivity, pH, oxidation/reduction potential, corrosion, biocide concentration, turbidity, temperature, flow, overflow dissolved oxygen, total suspended solids, ion concentration, and total dissolved solids.

6. The system of claim 4, wherein the one or more sensors are in communication with the controller, wherein the controller may actuate addition of a chemical into the particle-free fluid.

7. The system of claim 1, wherein the particle-free fluid has a flow rate from the first compartment to the second compartment of about 5.4 L/min to about 100 L/min.

8. The system of claim 1, further comprising a vacuum element in communication with the outlet, the vacuum element having an on position and an off position such that the vacuum element is operable in the off position when the outlet is in the closed state and the vacuum element is operable in the on position when the outlet is in the open state to remove the particulate matter.

9. The system of claim 8, wherein the outlet is in the open state and the vacuum element is operated in the on position at periodic intervals for about a 1 minute duration, depending on the flow rate, $T_{inlet}$, or turbidity of particle-free fluid entering the second compartment, or upon a signal from an operator.

10. A method for treating cooling fluid in a continuous metal casting process having a spray chamber, the method comprising:

providing a first compartment coupled to a spray chamber, wherein the first compartment includes a valve having an open position and a closed position, the valve operable to remove particulate matter from the first compartment and the cooling fluid when in the open position, defining particle-free fluid, and the valve retaining the particulate matter in the first compartment and the cooling fluid when in the closed position; and providing a second compartment fluidly coupled to the first compartment, the second compartment operable to receive the particle-free fluid from the first compartment, the second compartment in communication with a one or more sensors operable to measure at least one property of the particle-free fluid such that the particle-free fluid is reusable during the continuous metal casting process, wherein the valve is in communication with a temperature sensor via a controller, the temperature sensor operable to determine the temperature of the cooling fluid, the valve transitioning between the open state and the closed state based on the temperature of the cooling fluid measured by the temperature sensor.

11. The system of claim 1, wherein the controller is actuated by at least one algorithm to determine the open state or closed state of the outlet.

* * * * *

UNITED STATES PATENT AND TRADEMARK OFFICE
CERTIFICATE OF CORRECTION

PATENT NO. : 10,722,824 B2
APPLICATION NO. : 15/785844
DATED : July 28, 2020
INVENTOR(S) : Laia More Roca et al.

Page 1 of 1

It is certified that error appears in the above-identified patent and that said Letters Patent is hereby corrected as shown below:

On the Title Page

Column 2, Item (74) Attorney, Agent, or Firm, Line 2 - delete "Thumburg" and insert --Thornburg--.

Signed and Sealed this
Twenty-second Day of December, 2020

Andrei Iancu
*Director of the United States Patent and Trademark Office*